United States Patent
Ochi et al.

(10) Patent No.: US 7,185,668 B2
(45) Date of Patent: Mar. 6, 2007

(54) CLOSING DEVICE FOR FLUID PASSAGE

(75) Inventors: Koji Ochi, Kanagawa-ken (JP); Sakichi Hotta, Aichi-ken (JP)

(73) Assignee: NOF Corporation, Tokyo (JP)

( * ) Notice: Subject to any disclaimer, the term of this patent is extended or adjusted under 35 U.S.C. 154(b) by 202 days.

(21) Appl. No.: 10/888,389

(22) Filed: Jul. 9, 2004

(65) Prior Publication Data
US 2006/0005879 A1  Jan. 12, 2006

(51) Int. Cl.
F16K 17/38 (2006.01)

(52) U.S. Cl. .......................................... 137/79; 137/72

(58) Field of Classification Search ................ 137/80, 137/72, 75, 79, 68.13; 169/28; 251/59
See application file for complete search history.

(56) References Cited

U.S. PATENT DOCUMENTS

| | | | | |
|---|---|---|---|---|
| 2,192,630 A * | 3/1940 | Beam | ........................... | 137/458 |
| 2,780,389 A * | 2/1957 | Sandgren | ....................... | 222/5 |
| 3,782,681 A * | 1/1974 | Blackstein | .................... | 251/11 |
| 3,896,835 A * | 7/1975 | Wicke | .......................... | 137/75 |
| 3,955,589 A | 5/1976 | Beazley | ....................... | 137/75 |
| 4,072,159 A | 2/1978 | Kurosawa | .................... | 137/67 |
| 4,244,386 A * | 1/1981 | Hardesty | ................. | 137/68.13 |
| 4,270,849 A * | 6/1981 | Kalbfleisch | ................. | 251/292 |
| 4,619,284 A | 10/1986 | Delarue et al. | ................ | 137/67 |
| 4,787,459 A * | 11/1988 | Lee | ................................ | 169/42 |
| 5,485,884 A * | 1/1996 | Hanley et al. | ................ | 169/19 |
| 5,975,106 A * | 11/1999 | Morgan et al. | ............ | 137/78.5 |
| 6,368,432 B2 * | 4/2002 | Serizawa et al. | ............ | 149/46 |
| 6,550,495 B1 * | 4/2003 | Schulze | .................... | 137/614.2 |
| 6,959,719 B2 * | 11/2005 | Truss | ........................... | 137/72 |

* cited by examiner

*Primary Examiner*—Eric Keasel
*Assistant Examiner*—Cloud Lee
(74) *Attorney, Agent, or Firm*—Morris Manning & Martin LLP; Tim Tingkang Xia, Esq.

(57) ABSTRACT

A valve device for automatically closing a gas pipe when a fire breaks out. The valve device includes a gas thermosensitive generating composition, which decomposes and generates a large amount of gas within a short period when exposed to a high temperature. The valve body is driven with pressure of the gas generated by the gas generating composition.

18 Claims, 7 Drawing Sheets

(a) Open  (b) Gas Generating  (c) Closed (a) Open  (b) Gas Generating  (c) Closed (a) Closed  (b) Gas Generating  (c) Open

CLOSING DEVICE FOR FLUID PASSAGE

BACKGROUND OF THE INVENTION

The present invention relates to a device and method for closing a passage through which fluid flows, and more particularly, to a device and method for automatically closing a gas pipe through which inflammable gas flows during an emergency, such as when a fire breaks out.

Inflammable gas, such as propane or natural gas, flows through a gas pipe, such as a town gas pipe. A typical gas pipe used in buildings includes a gas meter incorporating a closing mechanism and a manual valve. When a fire breaks out, an indoor fire detector provides a detection signal to the closing mechanism of the gas pipe. In response to the detection signal, the gas closing mechanism closes the passage of gas. The manual valve may also be manually operated to stop the flow of gas.

However, the prior art has problems that are described below.

(1) There is a need to wire for electrically connecting the gas meter, which is located outdoors, and the fire detector, which is located indoors. Wiring is a burdensome work and may limit the location for installation of the gas meter.

(2) When the fire detector is erroneously activated, the closing mechanism closes the gas pipe.

(3) To reduce the weight of the gas meter and save costs, a case made of synthetic resin may be used to house the gas meter. In such a case, the high temperature during a fire may cause the gas meter to fall off from the pipe. As a result, the closing mechanism of the gas meter may not function effectively.

(4) When a fire breaks out in the vicinity of the gas meter, no one would be able to approach the manual valve. Therefore, it may be difficult to close the manual valve immediately after a fire breaks out.

U.S. Pat. No. 4,619,284 granted to Delarue et al. describes a prior art pyrotechnic valve arranged in a fuel valve for an aircraft. The pyrotechnic valve is electrically operated and thus needs to be wired.

U.S. Pat. No. 3,955,589 granted to Beazley describes a prior art valve that uses the urging force of a spring to drive a valve body. The valve includes a fusible cap that is melted by heat. The urging force of the spring closes the valve with the valve body when the fusible cap melts. However, this valve can be used only once. Further, a spring for moving the valve body is necessary. Thus, the structure of the valve is complicated.

U.S. Pat. No. 4,072,159 granted to Kurosawa describes a prior art valve that has a valve body and a thermal foamable plastic. When heated, the thermal foamable plastic expands and closes the valve body. However, the thermal foamable plastic has slow expansion speed, weak expansion force, and low temperature sensitivity. Therefore, the Kurosawa valve is not appropriate for use when the pipe must rapidly be closed during an emergency.

SUMMARY OF THE INVENTION

One aspect of the present invention is a device for automatically opening and closing a flow passage for fluid in accordance with the temperature around the flow passage. The device includes a case. A thermosensitive gas generating composition is accommodated in the case for generating gas when exposed to a temperature greater than or equal to a predetermined temperature. A valve mechanism is driven by the generation of gas to open or close the flow passage.

Another aspect of the present invention is a device for automatically opening and closing a flow passage of fluid in accordance with the temperature around the flow passage. The device includes a case. A thermosensitive composition is accommodated in the case for detecting the temperature around the flow passage and generating decomposition gas when detecting abnormal heat. A valve mechanism, driven by the pressure of the decomposition gas generated from the thermosensitive composition, opens or closes the flow passage.

A further aspect of the present invention is a valve attachment for attachment to a ball valve for rotating the ball valve to open or close a flow passage for fluid in accordance with the temperature around the flow passage. The valve attachment includes a case. A thermosensitive gas generating composition is accommodated in the case for generating gas when exposed to a temperature greater than or equal to a predetermined temperature. A rotary vane is accommodated in the case and rotated by a change in the pressure of the case, with the rotation of the rotary vane being transmitted to the ball valve body to rotate the ball valve body.

A further aspect of the present invention is a method for automatically opening and closing a flow passage of fluid in accordance with the temperature around the flow passage. The method includes attaching a valve to the flow passage to open or close the flow passage, preparing a thermosensitive gas generating composition for generating gas when exposed to a temperature greater than or equal to a predetermined temperature, and driving the valve with the pressure of the gas generated by the gas generating composition.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 4:
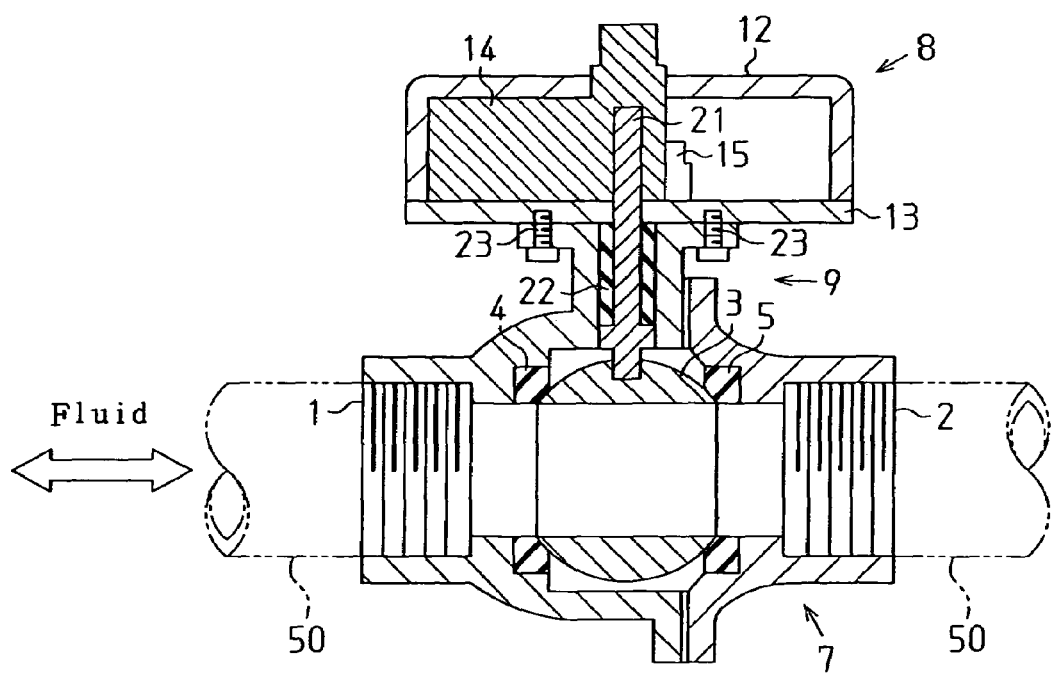
FIG. 4 is a cross-sectional view taken along line 4—4 in FIG. 1.
Figure 5:
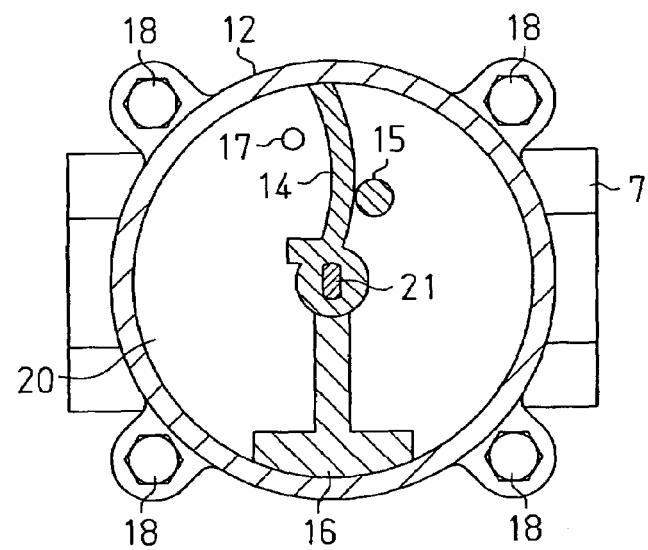
FIG. 5 is a cross-sectional view taken along line 3—3 in a state in which a flow passage is closed.
Figure 6:
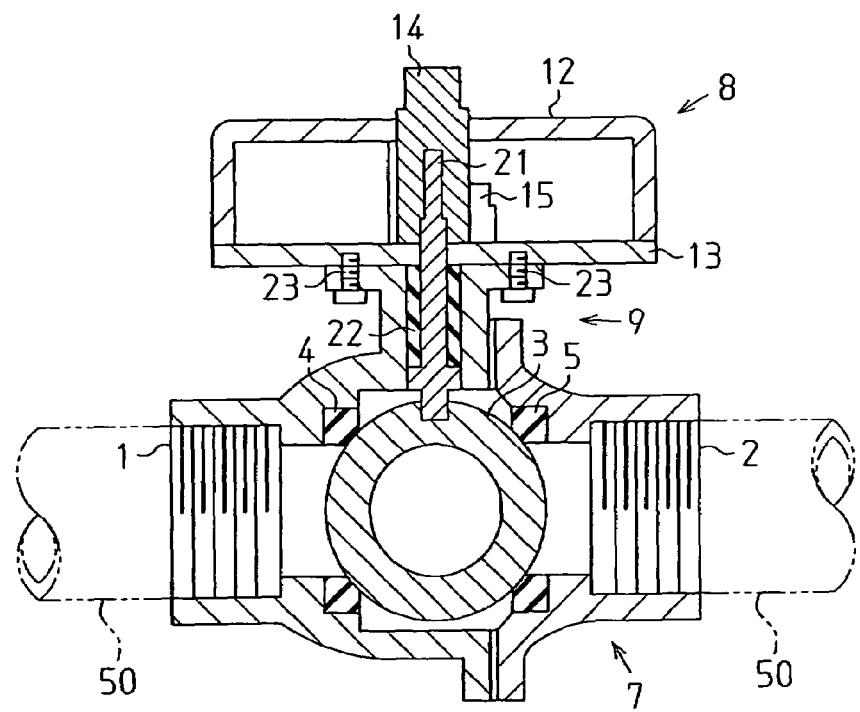
FIG. 6 is a cross-sectional view taken along line 4—4 in a state in which the flow passage is closed.

A valve device 100 according to a first embodiment of the present invention will now be described. As shown in FIG. 4, the valve device 100 is arranged on a flow passage, or pipe 50, through which fluid such as propane or natural gas flows. The valve device 100 may be used for a pipe through which a fluid other than gas, such as liquid, flows.

The valve device 100 includes a valve portion 7, which opens and closes the flow passage, a drive portion 8, which generates drive force for driving the valve portion 7, and a transmission portion 9, which transmits the drive force of the drive portion 8 to the valve portion 7.

Referring to FIG. 4, the valve portion 7 includes two valve housings 1 and 2, a ball valve body 3, and packings 4 and 5. The valve housings 1 and 2 are connected to each other by housing bolts 6. The ball valve body 3 is rotatably accommodated in the valve housings 1 and 2. The packings 4 and 5 prevent gas leakage. The valve portion 7 is normally made of metal such as stainless steel. The size of the valve portion 7 is determined in accordance with the diameter and material of the pipe 50 and the type of fluid flowing through the pipe 50. A commercially available ball valve may be used as the valve portion 7.

The drive portion 8 includes a case 10 and a thermosensitive gas generating composition 11, which ignites under high temperature, burns, and generates gas. The case 10 is formed from a cover 12 and a bottom plate 13, which are fastened to each other by case bolts 18. The pressure of the gas generated by the gas generating composition 11 drives the valve portion 7. It is preferred that the cover 12 and/or the bottom plate 13 be made of a metal material having high thermal conductivity.

The transmission portion 9 is connected to the drive portion 8 by support bolts 23. The transmission portion 9 includes a rotary vane 14 and a transmission shaft 21. The rotary vane 14 is rotatably arranged in the case 10. The transmission shaft 21 is connected to the rotary vane 14 and rotates integrally with the rotary vane 14. A packing 22 is arranged around the transmission shaft 21 to prevent gas leakage. The rotary vane 14 converts the pressure of the gas generated by the gas generating composition 11 to rotational movement. The transmission shaft 21 transmits the rotational movement of the rotary vane 14 to the ball valve body 3.

The thermosensitive gas generating composition 11 detects high temperatures and generates a large amount of gas. That is, the thermosensitive gas generating composition 11 functions as a temperature sensor and a drive force generating composition. In this specification, "high temperature" refers to an abnormally high temperature such as when a fire breaks out, and more specifically, to a temperature of 100° C. or greater. It is preferred that the gas generating composition 11 gradually starts to decompose as the temperature exceeds approximately 100° C. and then ignites and burns at approximately 200° C. so that a large amount of gas is generated within a short period of time. The gas generating composition 11 may be made of, for example, a composition of which the main ingredient is an organic nitrate such as nitrocellulose, a mixture of a reductant and a perchlorate such as ammonium perchlorate, or a mixture of a reductant and a nitrate such as ammonium nitrate. From the viewpoint of sensitivity to temperature and the amount of gas generated per unit weight, it is preferred that a gas generating composition of which the main ingredient is nitrocellulose be used. A gas generating composition of which the main ingredient is nitrocellulose gradually starts to decompose when the temperature exceeds 100° C. and ignites and burns when the temperature reaches approximately 180° C. It is preferred that the gas generating composition 11 generates 0.5 to 2.0 liters of gas per one gram. Further, it is preferred that the gas generating composition 11 generates nonflammable or flame-retardant gas.

Amines, azoles, active carbon, charcoal or a combination thereof may be used as the reductant.

The used amount (charged amount) of the gas generating composition 11 is determined in accordance with the type of the gas generating composition, the diameter of the pipe 50, and the size and torque of the ball valve body 3.

A partition 16 is arranged in the case 10. A chamber 20, in which the gas generating composition 11 is arranged, is defined between the partition 16 and the rotary vane 14.

The cover 12 is removable. This facilitates the replacement of the gas generating composition 11.

The rotary vane 14 has a basal end from which a projection 14a extends. The projection 14a contacts the partition 16 when the rotary vane 14 is located at an initial position, that is, before the gas generating composition 11 generates gas. A stopper pin 15 is arranged in the case 10. The rotary vane 14 contacts the stopper pin 15 when the rotary vane 14 is located at a terminal position, that is, after the gas generating composition 11 generates gas. The stopper pin 15 and the partition 16 function as a stopper for restricting the rotation range of the rotary vane 14.

The case 10 includes a gas ventilation hole 17 (pressure release mechanism) for releasing the gas generated by the gas generating composition 11 into the atmosphere after the rotary vane 14 is rotated. The gas ventilation hole 17 prevents the high pressure gas from remaining in the case 10 and ensures safety after the valve device 100 is activated. Further, the gas ventilation hole 17 prevents the case 10 and the rotary vane 14 from being damaged by abnormally high pressure in the case 10. Thus, the valve device 100 may be repeatedly used.

In the preferred embodiment, the rotary vane 14, the transmission shaft 21, and the valve body 3 function as a valve mechanism that uses the pressure of the gas generated by the gas generating composition 11 as a drive force.

Figure 1:
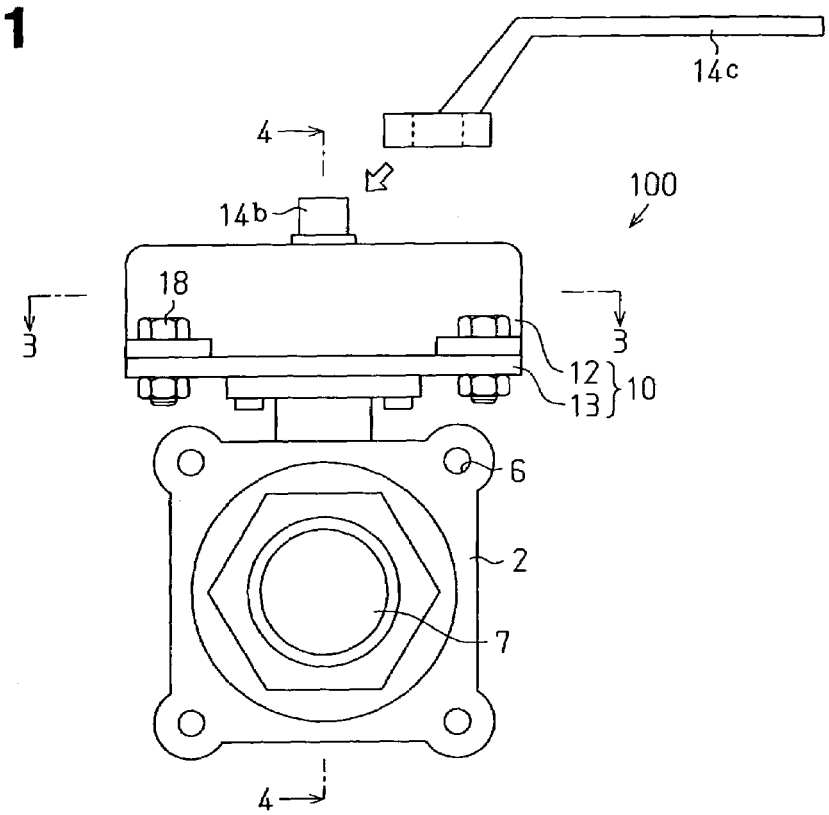
FIG. 1 is a side view showing a valve device according to a first embodiment of the present invention.
Figure 2:
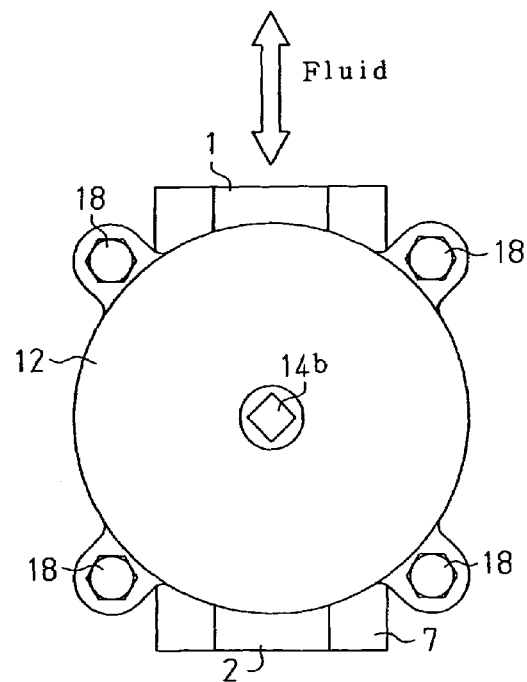
FIG. 2 is a plan view showing the valve device of FIG. 1.
Figure 3:
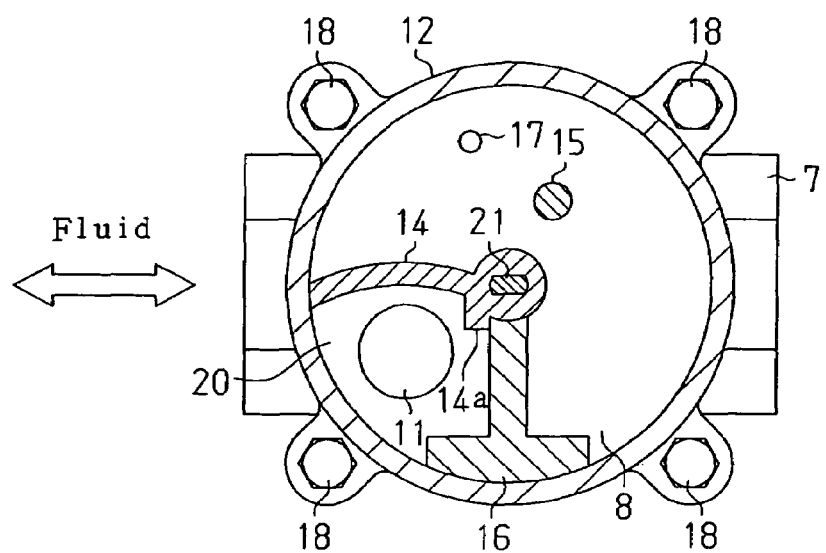
FIG. 3 is a cross-sectional view taken along line 3—3 in FIG. 1.

A general-purpose tool, such as a wrench, pliers, or a handle 14c (refer to FIG. 1) may be used to operate the valve mechanism. In such a case, for example, the rotary vane 14 or the transmission shaft 21 may include a connection portion 14b, which projects from the center of the case 10. The connection portion 14b may be connected to the handle 14c or be gripped by a general-purpose tool in order to manually operate the valve mechanism (the ball valve body 3).

The gas generating composition 11 may be filled in a cartridge and be arranged in the chamber 20. Alternatively, the gas generating composition 11 may be molded into a molded product having a predetermined shape and be arranged in the chamber 20. The molded product may be grains or pellets.

The drive portion 8 and the transmission portion 9 may be used as a valve drive attachment attached to a commercially available ball valve to drive the ball valve. For example, when the commercially available ball valve includes a rotation shaft rotated integrally with a ball valve body, the rotary vane 14 may be directly connected to the rotation shaft.

The operation of the valve device 100 will now be discussed.

The operation of the valve device 100 when connected to a normally open pipe, such as a gas pipe, will now be discussed.

Figure 7:
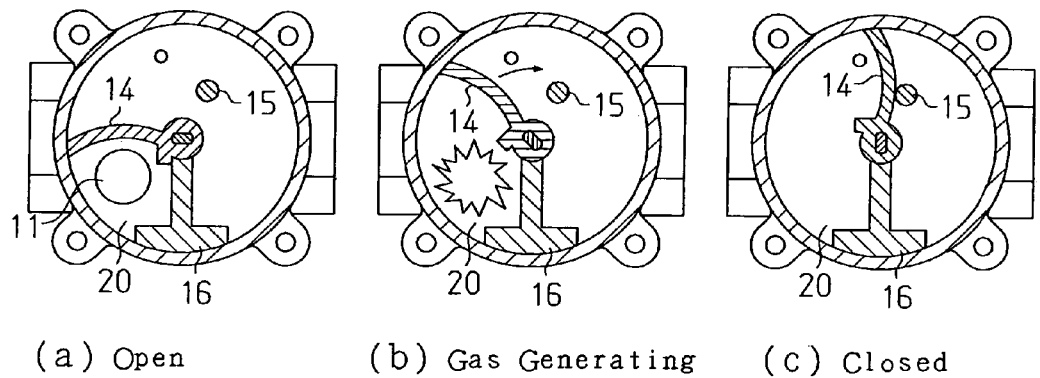
FIGS. 7a to 7c are cross-sectional views showing the operation of the valve device of FIG. 1 attached to a normally open pipe.

In an initial state, the flow passage is open, as shown in FIG. 7*a*. When a fire breaks out and the temperature around the valve device 100 becomes abnormally high, the gas generating composition 11 is automatically ignited and burned so that a large amount of gas is generated within a short period of time. The gas instantaneously increases the pressure of the chamber 20 and rotates the rotary vane 14 (FIG. 7*b*). The rotary vane 14 is rotated by 90 degrees and stopped at a position where it contacts the stopper pin 15. The ball valve body 3 rotates cooperatively with the rotary vane 14 and quickly closes the flow passage (FIG. 7*c*). In this manner, the flow of fluid, such as gas, is readily stopped during an emergency, such as when a fire breaks out.

The operation of the valve device 100 when connected to a normally closed pipe, such as a fire extinguisher pipe for sprinkling a fire distinguishing agent or water, will now be discussed.

Figure 8:
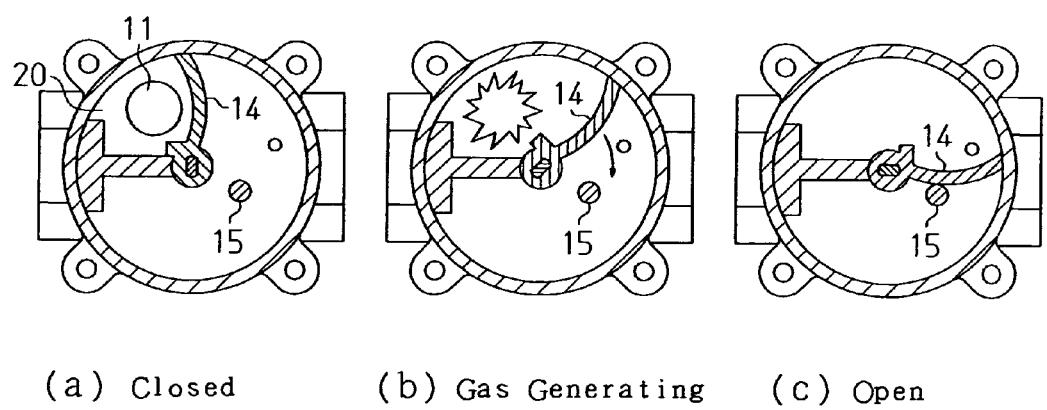
FIGS. 8a to 8c are cross-sectional views showing the operation of the valve device of FIG. 1 attached to a normally closed pipe.

In an initial state, the flow passage is closed, as shown in FIG. 8*a*. When a fire breaks out and the temperature around the valve device 100 becomes abnormally high, the gas generating composition 11 is automatically ignited and burned so that a large amount of gas is generated within a short period of time. The gas instantaneously increases the pressure of the chamber 20 and rotates the rotary vane (FIG. 8*b*). The rotary vane 14 is rotated by 90 degrees and stopped at a position where it contacts the stopper pin 15. The rotary vane 14 rotates cooperatively with the ball valve body 3 and quickly opens the flow passage (FIG. 8*c*). In this manner, a fire distinguishing agent or water is readily sprinkled during an emergency, such as when a fire breaks out.

Figure 9:
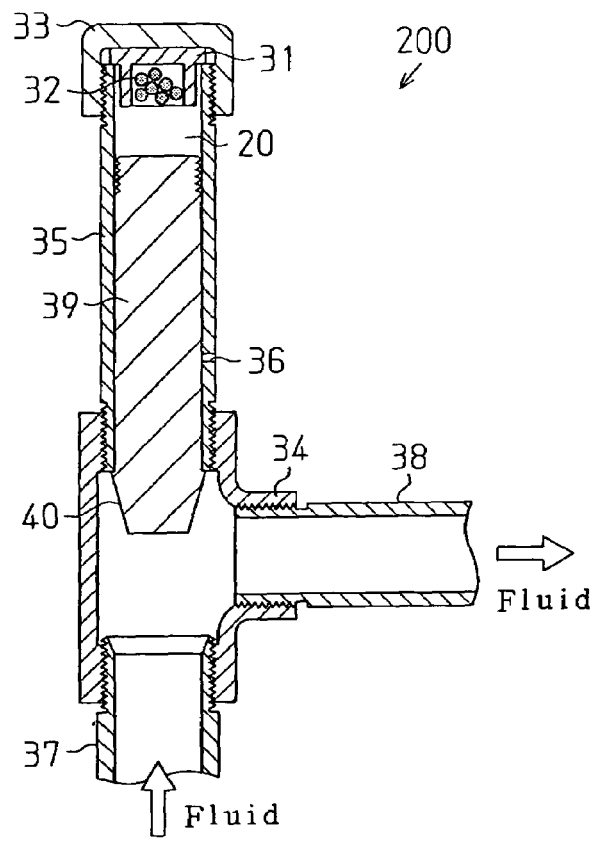
FIG. 9 is a cross-sectional view showing a valve device according to a second embodiment of the present invention.
Figure 10:
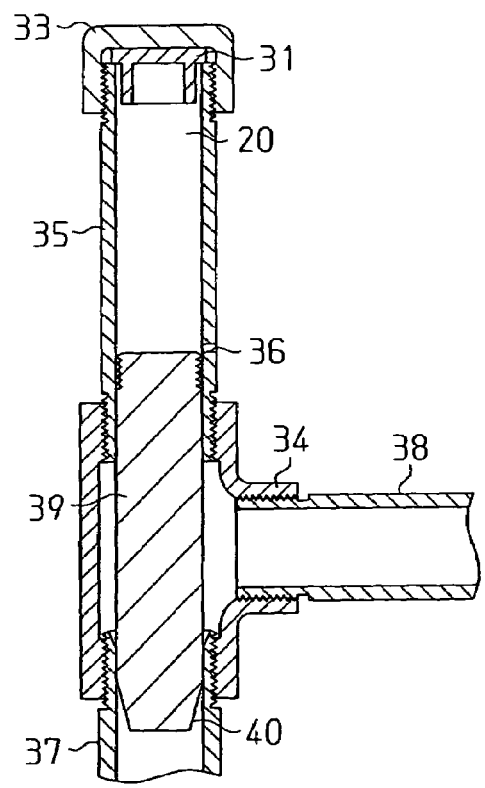
FIG. 10 is a cross-sectional view of the valve device of FIG. 9 in a state in which a flow passage is closed.

A valve device 200 according to a second embodiment of the present invention will now be discussed with reference to FIGS. 9 and 10.

The valve device 200 includes a protective tube 35, a piston valve body 39, a cap 33, which functions as a cover, and a thermosensitive gas generating composition 32. The protective tube 35 is attached to a T-shaped joint 34, which connects two pipes 37 and 38. The piston valve body 39 is movably retained in the protective tube 35. The cap 33 is removably fastened to an open end of the protective tube 35. The gas generating composition 32 is accommodated in a cartridge 31. A chamber 20 is defined in the protective tube 35 between the cap 33 and the piston valve body 39. The cartridge 31 has a flange engaged with the open end of the protective tube 35. The flange is held between the cap 33 and the open end of the protective tube 35. The protective tube 35 and the cap 33 function as a case. It is preferred that the protective tube 35 and/or the cap 33 be made of a metal material having high thermal conductivity.

The piston valve body 39 includes a tapered distal end 40. Further, the piston valve body 39 is movable between an initial position, which is shown in the state of FIG. 9, and a terminal position, which is shown in the state of FIG. 10. The protective tube 35 includes a gas ventilation hole 36 (pressure release mechanism). The gas ventilation hole 36 communicates the interior of the protective tube 35 with the exterior of the protective tube 35 when the piston valve body 39 is located at the terminal position.

The operation of the valve device 200 will now be discussed.

When a fire breaks out and the temperature around the valve device 200 becomes abnormally high, the gas generating composition 32 is automatically ignited and burned so that a large amount of gas is instantaneously generated. The gas increases the pressure of the chamber 20 in a sudden manner and actuates the piston valve body 39 downwards. As shown in the state of FIG. 10, the piston valve body 39 is stopped at a position where it gets stuck in the pipe 37. In this manner, the valve device 200 readily closes the flow passage during an emergency, such as when a fire breaks out. After the piston valve body 39 closes the flow passage, gas is released from the chamber 20 through the gas ventilation hole 36.

It should be apparent to those skilled in the art that the present invention may be embodied in many other specific forms without departing from the spirit or scope of the invention. Particularly, it should be understood that the present invention may be embodied in the following forms.

The fluid is not limited to liquid or gas and may be a solid, such as grains, or a sol.

A gas release valve, which opens at a predetermined pressure, may be attached to the gas ventilation holes 17 and 36.

The valve devices 100 and 200 are optimal for use in a pipe through which flows highly dangerous fluids, such as an inflammable substance or a toxic substance. For example, when an emergency occurs, the valve devices 100 and 200 are effective for closing pipes used in various types of plants, pipes used in nuclear reactors, or flow passages of ventilation ducts.

The valve devices 100 and 200 may be provided with an electrical igniter that electrically ignites the gas generating compositions 11 and 32 in response to the activation of a fire detector. In this case, when a fire breaks out at a location separated from the valve devices 100 and 200, the valve devices 100 and 200 can be activated before the temperature around the valve devices 100 and 200 becomes abnormally high.

The valve devices 100 and 200 of the present invention have the advantages described below.

(1) The valve devices 100 and 200 are automatically activated when detecting an abnormal temperature to open or close a flow passage. This prevents the leakage of an inflammable or toxic substance when a fire breaks out, which, in turn, prevents secondary disasters that may be caused by the inflammable or toxic substance.

(2) The valve devices 100 and 200 are automatically activated when detecting an abnormally high temperature. Thus, electric wiring connected to a power supply or a controller is not necessary. This eliminates the need for the burdensome work of electric wiring.

(3) The drive sources of the valve devices 100 and 200 are the gas generating compositions 11 and 32, respectively. Thus, the valve devices 100 and 200 do not have to be connected to a pipe that supplies activation gas such as compressed nitrogen or compressed air. Further, the valve devices 100 and 200 may be installed in factories or normal households that are not provided with a facility for supplying activation gas. Accordingly, the installation location of the valve devices 100 and 200 is not limited.

(4) The drive source of the valve devices 100 and 200 are the compact gas generating compositions 11 and 32, respectively. Thus, the valve devices 100 and 200 are compact, light, and inexpensive.

(5) The valve devices 100 and 200 do not have to be connected to a fire detector to be activated. Thus, unnecessary closing of flow passages by the valve devices 100 and 200 do not occur when the fire detector functions erroneously. Further, complicated wiring is not necessary. This facilitates the installation of the valve devices 100 and 200.

(6) The gas generating compositions 11 and 32 function as a sensor for detecting heat. Since a delicate and complicated component such as an electric heat sensor is unnecessary, the valve devices 100 and 200 seldom fail to function and have a high reliability.

(7) The cover 12 and the cap 33 are removable. Therefore, the gas generating compositions 11 and 32 may be replaced subsequent to activation of the valve devices 100 and 200 or after a predetermined period elapses from when the valve devices 100 and 200 are installed on pipes. Thus, the valve devices 100 and 200 do not have to be exchanged with new ones when activated only once and may be used repetitively.

(8) The valve device 100 of the first embodiment is convenient since it may be opened and closed by a general-purpose tool.

(9) The valve device 200 of the second embodiment is connected to a pipe by replacing a commercially available ninety-degree elbow joint with a T-shaped joint. This facilitates the installation of the valve device 200.

Examples of the present embodiment will now be discussed.

In example 1, the ingredients of the gas generating composition was nitrocellulose, diphenylamine (stabilizer), and graphite. The weight ratio of nitrocellulose, diphenylamine, and graphite was 99:1:0.3. The decomposition temperature (or temperature at which gas generation occurs) was in a range of 180 to 190° C. Further, 0.93 liters of gas was generated per gram of the gas generating composition.

Figure 11:
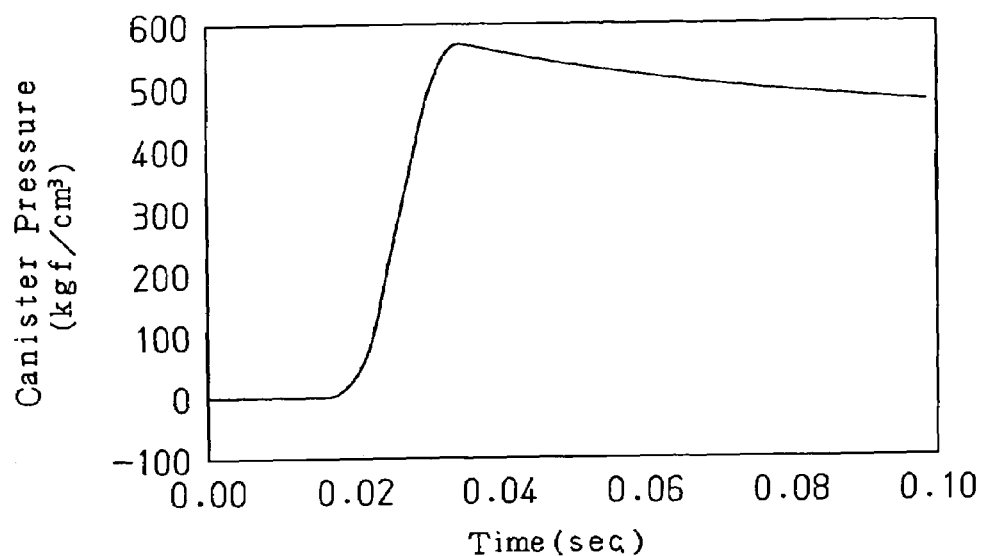
FIG. 11 is a graph showing the gas pressure profile of a gas generating composition in example 1.

FIG. 11 is a graph showing the change in pressure when 4.0 grams of the gas generating composition of example 1 was decomposed in a sealed canister. The gas generating composition of example 1 was molded into cylindrical pellets having a dimension of 1 mm×1 mm. Subsequent to decomposition, a high pressure of approximately 600 kgf/cm$^2$ was generated in approximately 0.03 seconds.

In example 2, the composition of the gas generating composition was 58.0 wt % of ammonium perchlorate, 40.0 wt % of sodium nitrate, and 2.0 wt % of active carbon. The decomposition temperature was approximately 215° C. Further, 0.705 liters of gas was generated per gram.

Figure 12:
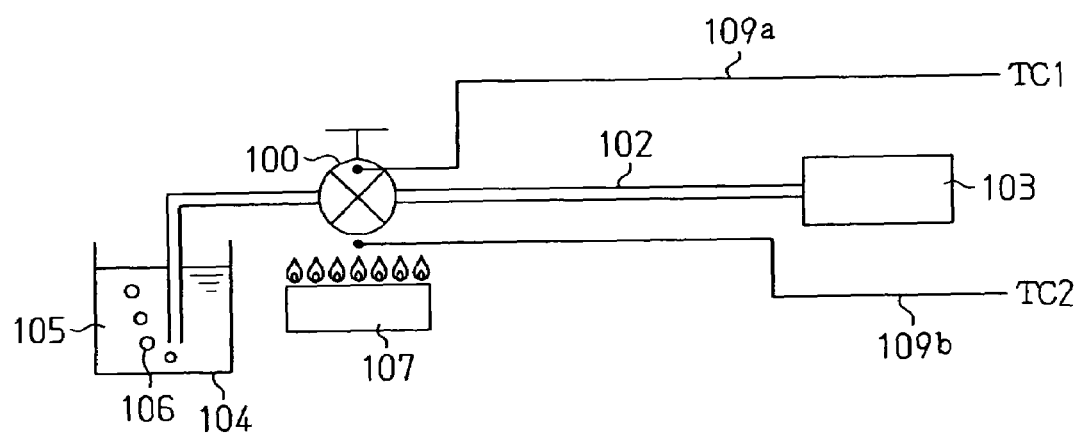
FIG. 12 is a schematic diagram showing an activation temperature testing device.

An activation temperature tester shown in FIG. 12 will now be described.

The valve device 100 of the first embodiment was prepared. The height of the valve device 100 was 122 mm, the diameter of the case 10 was 85 mm, and the weight of the valve device 100 was 2,450 grams.

The volume of the chamber 20 was 15 cm$^3$ when the rotary vane 14 was located at the initial position and 40 cm$^3$ when the rotary vane 14 was located at the terminal position. The gas generating composition 11 (2.0 grams) of example 1 or 2 was arranged in the chamber 20.

Figure 13:
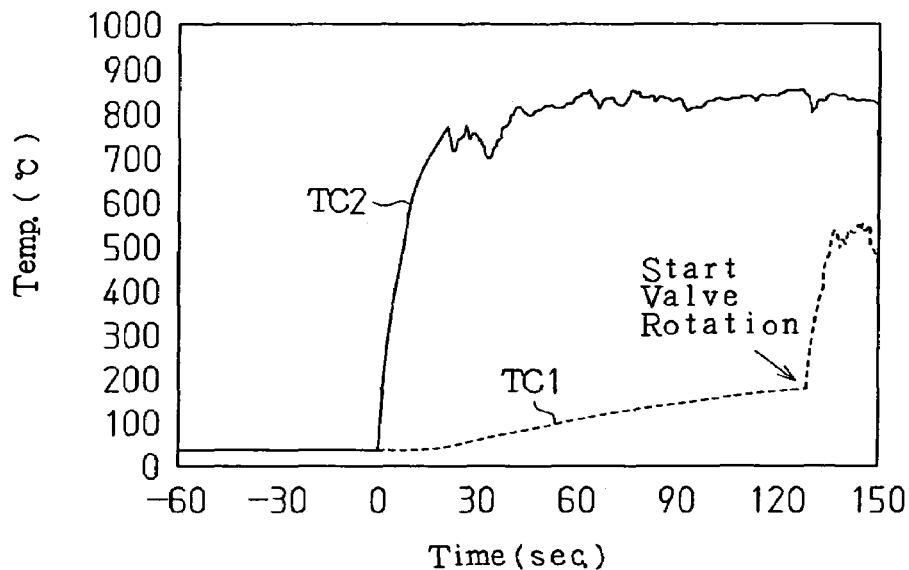
FIG. 13 is a graph showing the result of an activation temperature test.

The valve device 100 was attached to an air pipe connecting a compressor 103 and a water tank 104 filled with water 105. The state of the air flowing through the air pipe 102 was determined from bubbles 106 discharged from the distal end of the air pipe 102, which was submerged in the water tank 104. The valve device 100 was heated with the flame from a propane burner 107 encompassing the entire valve device 100. The chamber temperature TC1 and the ambient temperature TC2 of the valve device (flame temperature) were measured by thermocouples 109a and 109b. The measurement results are shown in FIG. 13.

The chamber temperature TC1 increased subsequent to the ignition of the gas burner 107. The valve device 100 was activated thereby stopping the flow of air when 129 seconds elapsed and the chamber temperature TC1 increased to 178° C. In a second test, the valve device 100 was activated when the chamber temperature TC1 reached 186° C. The activation temperatures of the valve device 100 (178° C. and 186° C.) are approximately within the decomposition initiation temperature range of 180° C. to 190° C. of the gas generating composition of example 1.

When using the gas generating composition of example 2, the valve device 100 was also activated near the decomposition initiation temperature (approximately 215° C.).

An activation pressure test will now be described.

Figure 14:
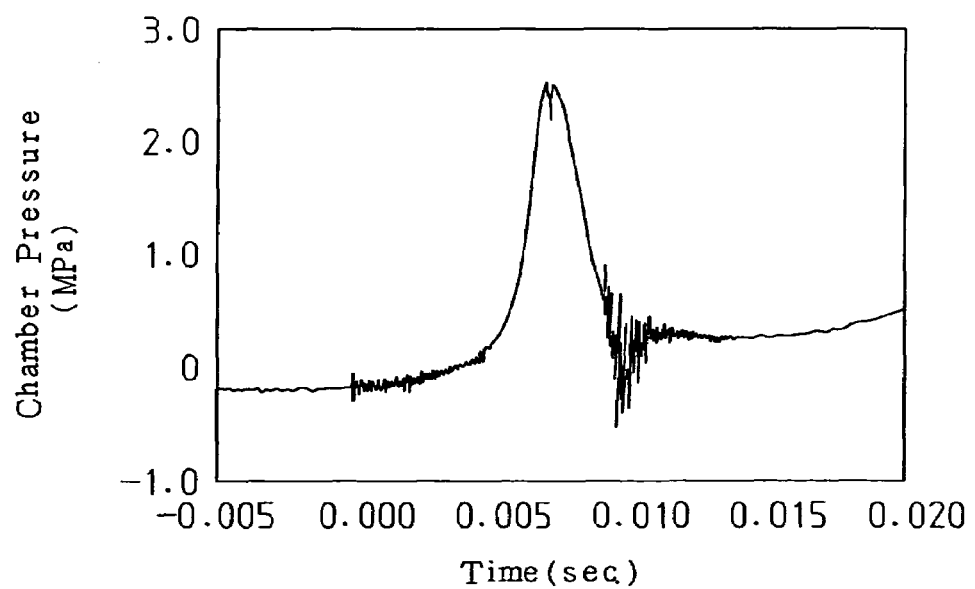
FIG. 14 is a graph showing the result of a chamber pressure test.

The graph of FIG. 14 shows the change of pressure in the chamber 20 when intentionally igniting the gas generating composition 11 (2.0 grams) of example 1 in the chamber 20. It has become apparent from the graph of FIG. 14 that the following events occur successively. When the gas generating composition 11 started to decompose, the pressure of the chamber 20 increased suddenly. When the force pushing the rotary vane 14 derived from the pressure in the chamber 20 exceeded the static friction force of the valve body 3, the rotary vane 14 started to turn. The force of the chamber pressure exceeding the static friction force of the valve body 3 turned the rotary vane 14 until it came into contact with the stopper pin 15. The high pressure gas in the chamber 20 was released through the gas ventilation hole 17. It took approximately 0.01 seconds from when the gas generating composition 11 was ignited to when the activation of the valve device 100 was completed.

From the above test result, it was confirmed that the valve device 100 closes or opens the flow passage within an extremely short period of time after detecting an abnormal temperature. Accordingly, the use of the valve device 100 is appropriate where it must have high heat sensitivity so that an emergency can be properly coped with.

The present examples and embodiments are to be considered as illustrative and not restrictive, and the invention is not to be limited to the details given herein, but may be modified within the scope and equivalence of the appended claims.

What is claimed is:

1. A device for automatically opening or closing a flow passage for fluid in accordance with the temperature around the flow passage, the device comprising:
   a case;
   a thermosensitive gas generating composition accommodated in the case for generating gas when exposed to a temperature greater than or equal to a predetermined temperature;
   a valve mechanism driven by the generation of gas to open or close the flow passage, wherein the valve mechanism includes a ball valve body rotated to open or close the flow passage, a rotary vane accommodated in the case and rotated by a pressure change in the case, and a transmission shaft, connecting the rotary vane and the bail valve body, for transmitting the rotation of the rotary vane to the ball valve body to rotate the ball valve body; and
   a stopper for restricting rotation range of the rotary vane, wherein the rotary vane is located at an initial position before the gas generating composition generates gas and is located at a terminal position after the gas generating composition generates gas, the stopper including a first stopper for restricting rotation past the initial position in one direction, and a second stopper for restricting rotation past the terminal position in the opposite direction, wherein:

the rotary vane includes a basal end connected to the transmission shaft, a distal end moved along an inner surface of the case when the rotary vane is rotated, and a projection formed on the basal end of the rotary vane;

the first stopper includes a partition arranged in the case to contact the projection when the rotary vane is located at the initial position; and the second stopper includes a pin arranged in the case to contact the rotary vane when the rotary vane is located at the terminal position.

2. The device according to claim 1, wherein the gas generating composition is arranged in a chamber defined in the case by the rotary vane and the case.

3. The device according to claim 2, wherein the rotary vane rotates when the gas generating composition generates gas and suddenly increases the pressure in the chamber.

4. The device according to claim 1, wherein the ball valve body opens the flow passage when the rotary vane is located at the initial position and closes the flow passage when the rotary vane is located at the terminal position.

5. The device according to claim 1, wherein the ball valve body closes the flow passage when the rotary vane is located at the initial position and opens the flow passage when the rotary vane is located at the terminal position.

6. The device according to claim 1, further comprising:
a pressure release mechanism for preventing excessive pressure increase in the case.

7. The device according to claim 6, wherein the pressure release mechanism includes a gas ventilation hole, extending through the case, for placing the chamber in fluid communication with the exterior thereof when the rotary vane is located at the terminal position.

8. The device according to claim 1, wherein the rotary vane includes a connection portion to which a tool is connected to manually rotate the rotary vane.

9. The device according to claim 1, wherein the case is made of a material having thermal conductivity.

10. The device according to claim 1, wherein the case includes a cover, and the gas generating composition is replaceable when the cover is opened.

11. The device according to claim 1, wherein the gas generating composition includes nitrocellulose as a main ingredient.

12. The device according to claim 1, wherein the gas generating composition includes:
a nitrate; and
a reductant that reacts wit the nitrate.

13. The device according to claim 12, wherein:
the nitrate is ammonium nitrate; and
the reductant is at least one compound selected from the group consisting of amines, azoles, active carbon, and charcoal.

14. The device according to claim 1, wherein the gas generating composition includes:
a perchlorate; and
a reductant that reacts with perchlorate.

15. The device according to claim 14, wherein:
the perchlorate is ammonium perchlorate; and
the reductant is at least one compound selected from the group consisting of amines, azoles, active carbon, and charcoal.

16. The device according to claim 1, wherein the gas generating composition starts to decompose at approximately 200 degree. C. and generates 0.5 to 2.0 liters of gas per gram.

17. The device according to claim 1, wherein the flow passage is a gas pipe through which fuel gas flows, and when a fire breaks out, the gas generating composition generates gas in response to heat produced by the fire to close the gas pipe with the ball valve body.

18. The device according to claim 1, wherein the flow passage is a fire extinguisher pipe through which a fire extinguishing agent or water flows, and when a fire breaks out, the gas generating composition generates gas in response to heat produced by the fire to open the fire extinguisher pipe.

* * * * *